(12) United States Patent
Gokhale et al.

(10) Patent No.: US 8,375,714 B2
(45) Date of Patent: Feb. 19, 2013

(54) SYSTEM AND METHOD FOR OPERATING A TURBOCHARGED ENGINE

(75) Inventors: Manoj Prakash Gokhale, Bangalore (IN); Roy James Primus, Niskayuna, NY (US); Kendall Roger Swenson, Erie, PA (US)

(73) Assignee: General Electric Company, Niskayuna, NY (US)

( * ) Notice: Subject to any disclaimer, the term of this patent is extended or adjusted under 35 U.S.C. 154(b) by 1245 days.

(21) Appl. No.: 11/167,420

(22) Filed: Jun. 27, 2005

(65) Prior Publication Data

US 2006/0288702 A1 Dec. 28, 2006

(51) Int. Cl.
*F02B 33/44* (2006.01)
*F02D 23/00* (2006.01)
*G01M 19/00* (2011.01)
*G06F 19/00* (2011.01)
*G06F 7/70* (2006.01)

(52) U.S. Cl. .............. 60/611; 60/601; 60/602; 701/114
(58) Field of Classification Search ............ 60/600–603, 60/611; 73/118.1, 119 A; 701/114; 244/221; 415/47
See application file for complete search history.

(56) References Cited

U.S. PATENT DOCUMENTS

| | | | | | |
|---|---|---|---|---|---|
| 2,696,345 | A | * | 12/1954 | Hopper | 415/47 |
| 4,467,607 | A | * | 8/1984 | Rydquist et al. | 60/602 |
| 4,713,965 | A | * | 12/1987 | Kobayashi | 73/119 A |
| 4,849,897 | A | * | 7/1989 | Ciccarone | 60/611 |
| 5,025,629 | A | * | 6/1991 | Woollenweber | 60/602 |
| 5,526,645 | A | * | 6/1996 | Kaiser | 60/611 |
| 5,829,254 | A | * | 11/1998 | Hayashi et al. | 60/602 |
| 5,850,738 | A | * | 12/1998 | Hayashi | 60/602 |
| 6,224,021 | B1 | * | 5/2001 | Tanaka | 244/221 |
| 6,298,718 | B1 | * | 10/2001 | Wang | 73/118.1 |
| 6,687,601 | B2 | * | 2/2004 | Bale et al. | 60/602 |
| 6,694,735 | B2 | | 2/2004 | Sumser et al. | 60/605.2 |
| 6,782,737 | B2 | * | 8/2004 | Wright | 73/114.16 |
| 6,785,604 | B2 | * | 8/2004 | Jacobson | 701/114 |
| 6,883,318 | B2 | * | 4/2005 | Warner et al. | 60/602 |
| 6,990,814 | B2 | * | 1/2006 | Boley et al. | 60/611 |
| 7,007,472 | B2 | * | 3/2006 | Baize et al. | 60/602 |
| 7,089,738 | B1 | * | 8/2006 | Boewe et al. | 60/602 |
| 7,143,580 | B2 | * | 12/2006 | Ge | 60/605.1 |
| 2004/0194767 | A1 | | 10/2004 | Igarashi et al. | 123/562 |
| 2004/0216457 | A1 | | 11/2004 | Shea et al. | 60/608 |
| 2005/0056015 | A1 | | 3/2005 | Fledersbacher et al. | 60/602 |
| 2007/0033936 | A1 | * | 2/2007 | Panciroli | 60/602 |

FOREIGN PATENT DOCUMENTS

| | | | | |
|---|---|---|---|---|
| DE | 19705463 | A1 | * | 8/1998 |
| JP | 63071524 | A | * | 3/1988 |
| JP | 63120821 | A | * | 5/1988 |
| JP | 63120822 | A | * | 5/1988 |

OTHER PUBLICATIONS

CPEL0653092 Office Action, Date of issue: Mar. 27, 2009.

* cited by examiner

*Primary Examiner* — Thai-Ba Trieu
(74) *Attorney, Agent, or Firm* — Joseph J. Christian (57) ABSTRACT

A method of operating a turbocharged system includes controlling speed of a turbocharger and substantially eliminating choke of a compressor coupled to a turbine by adjusting exhaust flow through a turbine wastegate, or by adjusting airflow through a compressor recirculation valve, or by adjusting a combination thereof in response to variance in parameters including compressor inlet temperature, compressor inlet pressure, and turbocharger speed.

39 Claims, 8 Drawing Sheets

SYSTEM AND METHOD FOR OPERATING A TURBOCHARGED ENGINE

BACKGROUND

The invention relates generally to a system and method of operating a turbocharged engine and, more specifically, to a system and method for controlling compressor choke in a turbocharged engine operated at high altitude regions.

In certain applications, the turbocharged engines are used in relatively extreme environmental conditions, such as high altitudes. For example, diesel powered locomotives can travel through a wide range of environmental conditions, particularly in mountainous regions. These environmental conditions can adversely affect engine performance, efficiency, exhaust pollutants, and other engine characteristics. For example, diesel engines operating in mountainous regions are subject to greater loads due to higher gradients, lower atmospheric pressures due to higher altitudes, lower temperatures due to colder climate or higher altitude, lower air density due to lower atmospheric pressure, and so forth. At high altitudes, the compressor and the turbocharger speed can increase beyond a preselected limit without suitable control measures. In addition, the pressure ratio across the compressor can increase beyond a preselected limit at high altitudes, such that an operating point of the compressor is pushed into a choke region. The maximum compressor volume flow rate is often limited by the cross-section of a compressor inlet. For example, if the air flow rate at a compressor wheel inlet reaches a sonic velocity, then no further increase in the air flow rate is possible. This threshold limit in the air flow rate is represented as a "choke line". In certain cases, the speed of the turbine may be maintained within the design limit by reducing the power output of the engine. However, reducing of the power output of the engine at higher altitudes results in reduction of hauling capacity of the engine.

Therefore, a technique is needed for controlling compressor choke in a turbocharged engine operated at high altitude regions.

BRIEF DESCRIPTION

In accordance with one aspect of the present technique, a method of operating a turbocharged system is provided. The method includes controlling speed of a turbine and substantially eliminating choke of a compressor coupled to the turbine by adjusting exhaust flow through a turbine wastegate, or by adjusting airflow through a compressor recirculation valve, or by adjusting a combination thereof in response to variance in parameters including compressor inlet temperature, compressor inlet pressure, and turbocharger speed.

In accordance with another aspect of the present technique, a system comprising a turbocharged engine is provided. The system includes a controller configured to control speed of a turbine and substantially eliminate choke of a compressor coupled to the turbine by adjusting exhaust flow through a turbine wastegate, or by adjusting airflow through a compressor recirculation valve, or by adjusting a combination thereof in response to variance in parameters including compressor inlet temperature, compressor inlet pressure, and turbocharger speed.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
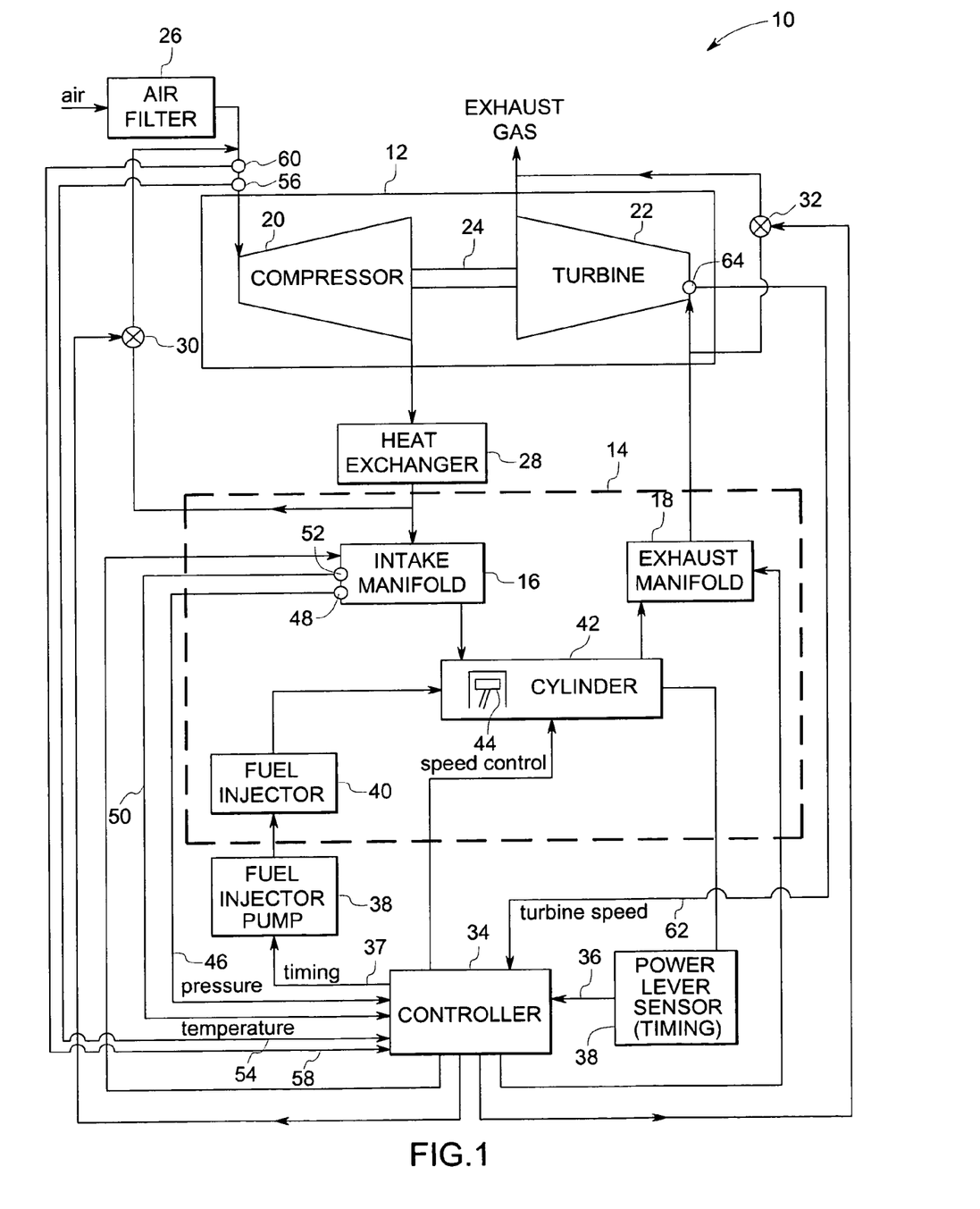
FIG. 1 is a diagrammatical representation of a turbocharged engine, such as a locomotive power unit, having choke elimination and turbocharger speed control features in accordance with an exemplary embodiment of the present technique.

Referring to FIG. 1, a turbocharged system 10 having choke elimination and turbocharger speed control features is illustrated in accordance with certain embodiments of the present technique. In the illustrated embodiment, the turbocharged system 10 is a locomotive power unit. The locomotive power unit 10 includes a turbocharger 12 and a compression-ignition engine, e.g. diesel engine 14. As discussed in further detail below, embodiments of the present technique provide monitoring and control features, such as sensors and control logic, to control turbocharger speed and substantially eliminate compressor choke within the locomotive power unit 10. For example, in certain extreme environments such as high altitude mountainous regions, the compressor choke is substantially eliminated and turbocharger speed is reduced to acceptable/desirable levels by adjusting the flow of engine exhaust through the turbocharger 12, adjusting airflow recirculation through the turbocharger 12, reducing engine speed, adjusting the fuel injection timing and/or by reducing engine power.

The illustrated engine 14 includes an air intake manifold 16 and an exhaust manifold 18. The turbocharger 12 includes a compressor 20 and a turbine 22 and is operated to supply compressed air to the intake manifold 16 for combustion within a cylinder 42. The turbine 22 is coupled to the exhaust manifold 18, such that the exhaust gases expand through the turbine 22, putting work onto and rotating the turbocharger shaft 24 connected to the compressor 20. The compressor 20 draws ambient air through a filter 26 and provides compressed air to a heat exchanger 28. The temperature of air is increased due to compression through the compressor 20. The compressed air flows through the heat exchanger 28 such that the temperature of air is reduced prior to delivery into the intake manifold 16 of the engine 14. In one embodiment, the heat exchanger 28 is an air-to-water heat exchanger, which utilizes a coolant to facilitate removal of heat from the compressed air. In another embodiment, the heat exchanger 28 is an air-to-air heat exchanger, which utilize ambient air to facilitate removal of heat from compressed air.

In the illustrated embodiment, a recirculation valve 30 is provided to recirculate a desired amount of the airflow exiting from the heat exchanger 28 back through the compressor 20. In an alternative arrangement, air can be recirculated before entering the heat exchanger 28. As discussed below, the amount of air recirculation can be controlled based on various environmental and operating conditions, such that the engine performs within desired performance parameters. In addition, a desired amount of the engine exhaust from the exhaust manifold 18 can by-pass the turbine 22 via a wastegate 32. As discussed below, the amount of exhaust by-passing can be controlled based on various environmental and operating conditions, such that the engine performs within desired performance parameters.

The power unit 10 also includes a controller 34. In one embodiment, the controller 34 is an electronic logic controller that is programmable by a user. In another embodiment, the controller 34 is an electronic fuel injection controller for the engine 14. The controller 34 receives a power lever setting signal 36 from a power lever position sensor 38 provided to detect the position of an operator controlled power lever (not shown) of the engine 14. The controller 34 may be operable to produce a timing signal 37 to control operation of a plurality of fuel injection pumps 38. The pumps 38 drive a plurality of fuel injectors 40 for injecting fuel into the plurality of cylinders 42 of the engine 14. A piston 44 is slidably disposed in each cylinder 42 and reciprocates between a top dead center and a bottom dead center position. The controller 34 may also receive an intake manifold air pressure signal 46 generated by a pressure sensor 48, an intake manifold air temperature signal 50 generated by a temperature sensor 52, a compressor inlet pressure signal 54 generated by an inlet pressure sensor 56, and a compressor inlet temperature signal 58 generated by a inlet temperature sensor 60. The controller 34 may also receive a turbocharger speed signal 62 from a speed sensor 64 provided to detect speed of the turbocharger 12.

Figure 2:
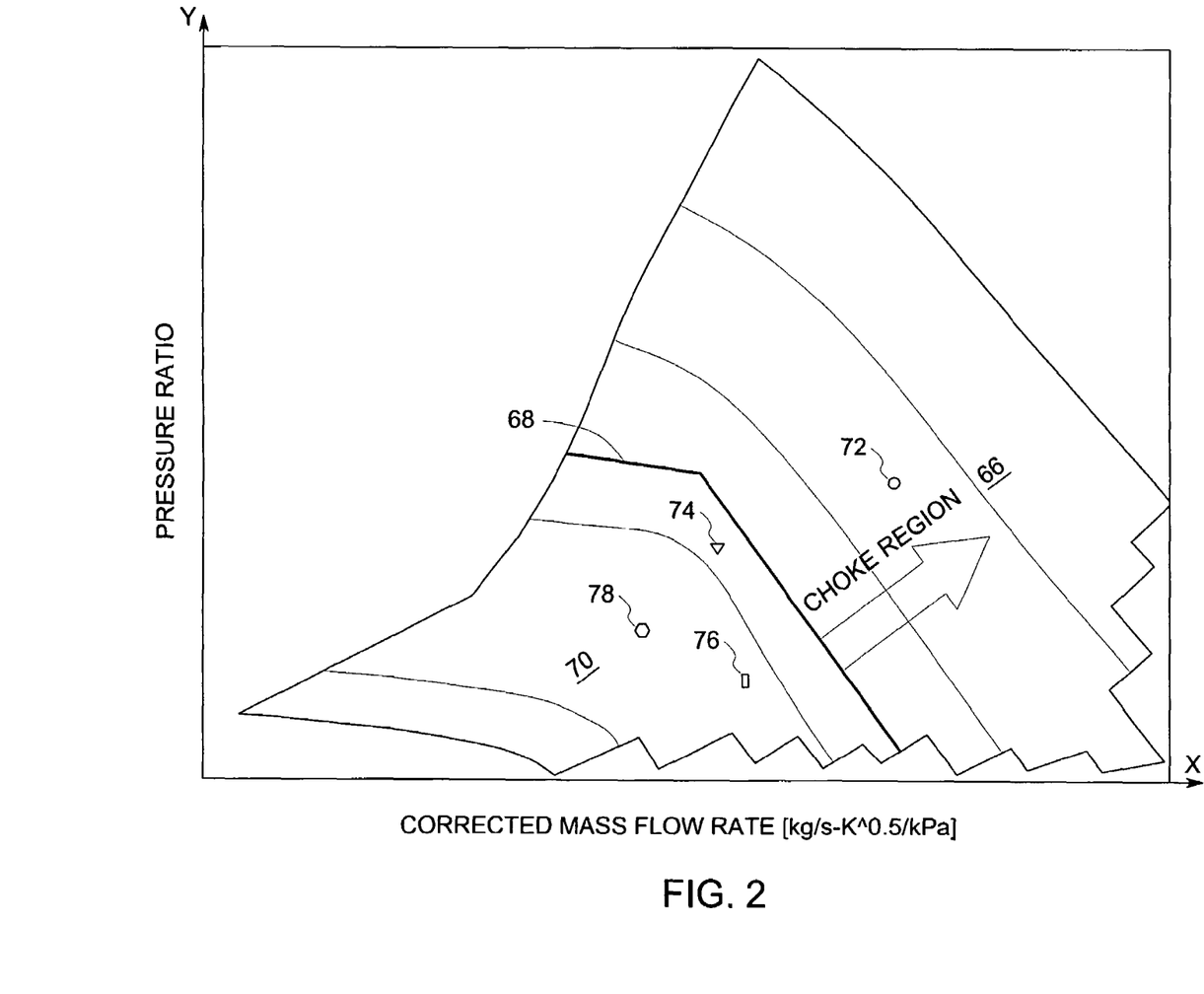
FIG. 2 is a compressor map illustrating a plurality of operating points in accordance with an exemplary embodiment of the present technique.

Referring to FIG. 2, a compressor map representing variation of air pressure ratio across the compressor 20 (represented by the Y-axis) relative to corrected air mass flow rate across the compressor 20 (represented by the X-axis) is illustrated in accordance with embodiments of the present technique. The pressure ratio across the compressor 20 may be defined as the ratio of compressor inlet pressure to compressor outlet pressure. The corrected air mass flow rate is computed in accordance with the following relation.

$$\text{corrected air mass flow rate} = \text{Actual air mass flow rate} \times \frac{\sqrt{CmpTin}}{CmpPin}$$

The corrected air mass flow rate normalizes the effect of compressor inlet pressure and temperature.

In the illustrated compressor map, a region 66 above a choke line 68 generally illustrates a "choke region" and a region 70 below the choke line 68 generally illustrates a "normal operating region" of the compressor 20. At higher altitude and cold ambient conditions (e.g. at 5100 meters altitude, and −45 degrees celsius), ambient pressure and atmospheric air density are reduced. Because load on the compressor 20 is reduced, the compressor speed and hence the turbocharger speed is increased above a pre-selected turbocharger speed. At higher speeds, the pressure ratio across the compressor 20 is increased with the increase in corrected mass flow rate. As a result, an operating point indicated by a reference numeral 72 of the compressor 20 is pushed above the choke line 68. This indicates that the operating point 72 of the compressor 20 is in the choke region 66.

In one embodiment, when the exhaust from the engine 14 is by-passed around the turbine 22 via the wastegate 32, speed of the turbocharger 12 is reduced. As a result, the pressure ratio and the corrected mass flow rate across the compressor 20 are reduced to an adjusted operating point indicated by reference numeral 74, such that operation of the compressor 20 is pushed below the choke line 68. This indicates that the compressor 20 is in the normal operating region 70. In another embodiment, when the compressed air is recirculated through the compressor 20 via the recirculation valve 30, the corrected air mass flow rate and the pressure ratio across the compressor 20 are reduced to an adjusted operating point indicated by reference numeral 76, such that operation of the compressor 20 is maintained below the choke line 68. Again, this adjusted operating point 76 is in the normal operating region 70. In another embodiment, when the compressed air is recirculated through the compressor 20 via the recirculation valve 30 in combination with reduction in engine speed (e.g. reduce engine speed by 15 percent), the corrected air mass flow rate and the pressure ratio across the compressor 20 are reduced. As a result of these controlled adjustments, operation of the compressor 20 shifts from the original choked operating point 72 to an adjusted operating point indicated by reference numeral 78 below the choke line 68 in the normal operating region 70.

Figure 3:
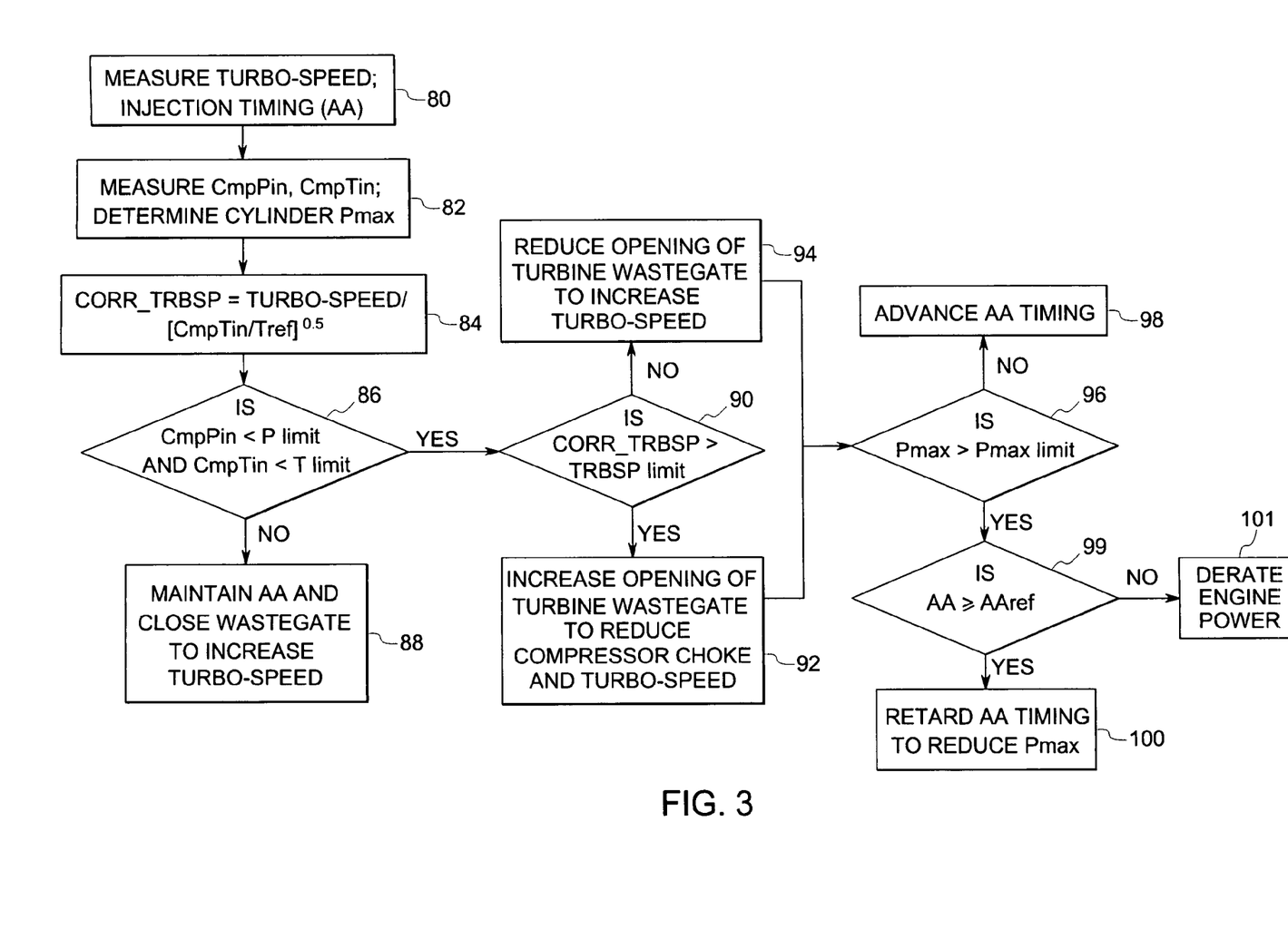
FIGS. 3, 4, 5, 6 are flow charts illustrating processes of controlling turbocharger speed and eliminating compressor choke within a turbocharged engine in accordance with certain embodiments of the present technique.

Referring to FIG. 3, this figure is a flow chart illustrating one embodiment of the method of operating the turbocharged system 10 of FIG. 1. In the illustrated embodiment, the controller 34 determines fuel injection timing or advance angle (AA) based on the position of the power lever as represented by step 80. The controller 34 also receives the turbocharger speed signal 62 from the speed sensor 64 provided to detect speed of the turbocharger 12. The controller 34 receives the compressor inlet pressure signal 54 generated by the inlet pressure sensor 56, and the compressor inlet temperature signal 58 generated by the inlet temperature sensor 60 as represented by step 82. The controller 34 also receives an actual value of a sensed parameter indicative of maximum pressure (Pmax) within a combustion chamber of the engine 14. For example, the actual value indicative of maximum pressure (Pmax) may be obtained via the pressure sensor 48 of FIG. 1. The maximum pressure (Pmax) refers to the maximum pressure inside a cylinder within the compression-ignition engine 14 and, specifically, the maximum pressure (Pmax) generally occurs at or near a top-dead-center (TDC) position of the piston. In another example, the actual value indicative of the maximum pressure may be obtained based on a plurality of sensed operating parameters of the compression-ignition engine 14. The controller 34 also calculates an expected value indicative of the maximum pressure (Pmax-limit) within the combustion chamber. As discussed below, the Pmax-limit is generally used as a control parameter or trigger, which triggers the controller 34 to adjust various operational parameters of the engine 14 if the actual Pmax exceeds this Pmax-limit. The expected value indicative of the maximum pressure (Pmax-limit) can be calculated based on the actual value indicative of the maximum pressure (Pmax) and the air temperature within the intake manifold 16.

A corrected turbocharger speed value (Corr_Trbsp) is calculated based on the actual speed of the turbocharger 12, the compressor inlet temperature (CmpTin) and a reference temperature (Tref) in accordance with the following relation as represented by step 84:

$$\text{Corr\_Trsp} = \frac{turbospeed}{\sqrt{\frac{CmpTin}{Tref}}} \quad (1)$$

Using corrected speed allows universal turbocharger performance maps to be used and is standard practice in turbomachinery calculations. A representative value for Tref is 298 Kelvin.

The compressor inlet pressure (CmpPin) is compared to a preselected pressure (Plimit) and the compressor inlet temperature (CmpTin) is compared to a preselected temperature (Tlimit) as represented by step 86. If the compressor inlet pressure (CmpPin) is greater than the preselected pressure (Plimit) and/or if the compressor inlet temperature (CmpTin) is greater than the preselected temperature (Tlimit), the fuel injection timing is maintained and the wastegate is closed as represented by step 88. As a result, exhaust flow through the turbine 22 is increased and hence the turbocharger speed is increased. In one example, if the compressor inlet pressure (CmpPin) is greater than 0.6 bar and if the compressor inlet temperature (CmpTin) is greater than −5 degrees celsius, the fuel injection timing is maintained and the wastegate is closed to increase the turbocharger speed.

If the compressor inlet pressure (CmpPin) is less than the preselected pressure (Plimit) and if the compressor inlet temperature (CmpTin) is less than the preselected temperature (Tlimit), then the corrected turbocharger speed value (Corr_Trbsp) is compared with a preselected turbocharger speed (Trbsplimit) as represented by step 90. In one example, the preselected turbocharger speed is 24000 revolutions per minute. If the corrected turbocharger speed (Corr_Trbsp) is greater than the preselected turbocharger speed (Trbsplimit), then the opening of the wastegate 32 is increased to increase the amount of exhaust by-passing the turbine 22 as represented by step 92. The exhaust flow through the turbine is reduced and hence the turbocharger speed is reduced. Due to reduction in turbocharger speed, the pressure ratio and airflow rate across the compressor are reduced and the compressor choke is eliminated. If the corrected turbocharger speed (Corr_Trbsp) is less than the preselected turbocharger speed (Trbsplimit), then the opening of the wastegate 32 is reduced to reduce the amount of engine exhaust by-passing the turbine 22 as represented by step 94. As a result, turbocharger speed is increased.

If the opening of the wastegate 32 is increased or reduced, then the actual value indicative of the maximum pressure (Pmax) is compared to the expected value indicative of the maximum pressure (Pmax-limit) as represented by step 96. If the actual value indicative of the maximum pressure (Pmax) is less than the expected value indicative of the maximum pressure (Pmax-limit), then the power output of the engine 14 is maintained and the fuel injection timing within the combustion chamber may be advanced as represented by step 98. If the actual value indicative of the maximum pressure (Pmax) is greater than the expected value indicative of the maximum pressure (Pmax-limit), and if the fuel injection timing (AA) is greater than or equal to a predetermined injection timing limit (AAref) as represented by step 99, then the fuel injection timing within the combustion chamber may be retarded to reduce the maximum pressure (Pmax) within the combustion chamber as represented by step 100. If the actual value indicative of the maximum pressure (Pmax) is greater than the expected value indicative of the maximum pressure (Pmax-limit), and if the fuel injection timing (AA) is less than the predetermined injection timing limit (AAref), then the engine power must be reduced to satisfy the constraints as represented by step 101. In the illustrated embodiment, if the fuel injection timing (AA) is less than a predetermined injection timing limit, then the controller 34 derates engine power, or controls speed of the turbine 22, or controls intake air pressure within the intake manifold 16. More specifically, the engine power is derated by controlling the amount of fuel injected into the combustion chamber. If the fuel injection timing (AA) is greater than or equal to the predetermined injection timing limit, then the fuel injection timing within the combustion chamber is retarded. The fuel injector pump 38 is operable to receive the timing signal 37 from the controller 34 and control the fuel injector 40 for adjusting the fuel injection timing.

Figure 4:
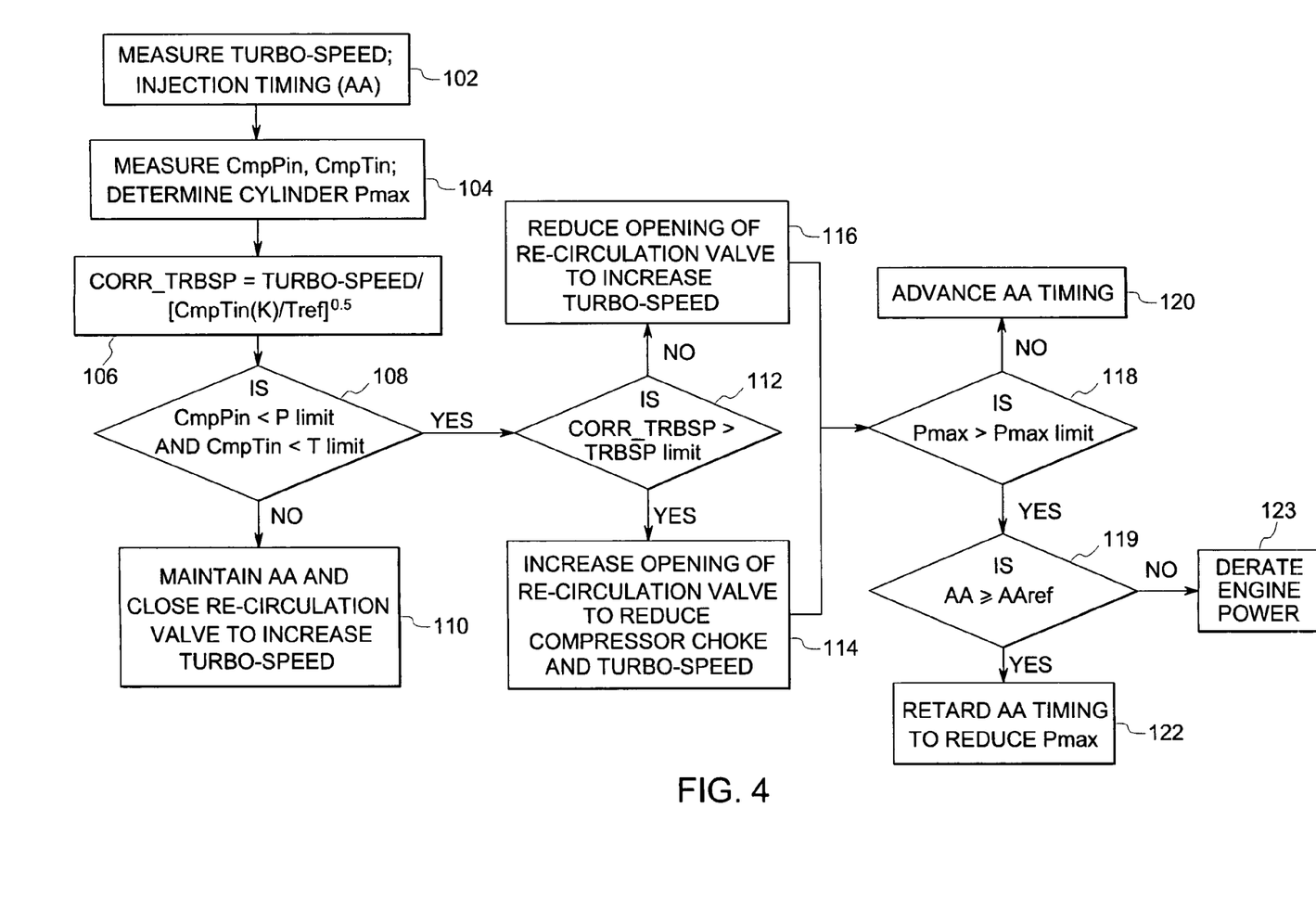

Referring to FIG. 4, this figure is a flow chart illustrating another embodiment of the method of operating the turbocharged system 10 of FIG. 1. In the illustrated embodiment, the controller 34 determines fuel injection timing or advance angle (AA) based on the position of the power lever as represented by step 102. The controller 34 also receives the turbocharger speed signal 62 from the speed sensor 64 provided to detect speed of the turbocharger 12. The controller 34 receives the compressor inlet pressure signal 54 generated by the inlet pressure sensor 56, and the compressor inlet temperature signal 58 generated by the inlet temperature sensor 60 as represented by step 104. The controller 34 also receives an actual value of a sensed parameter indicative of maximum pressure (Pmax) within a combustion chamber of the engine 14. The controller 34 also calculates an expected value indicative of the maximum pressure (Pmax-limit) within the combustion chamber. The expected value indicative of the maximum pressure (Pmax-limit) can be calculated based on the actual value indicative of the maximum pressure and the air temperature within the intake manifold 16. The corrected turbocharger speed value (Corr_Trbsp) is calculated based on the actual speed of the turbocharger 12 and the compressor inlet temperature (CmpTin) in accordance with the equation (1) as represented by step 106.

The compressor inlet pressure (CmpPin) is compared to the preselected pressure (Plimit) and the compressor inlet temperature (CmpTin) is compared to the preselected temperature (Tlimit) as represented by step 108. If the compressor inlet pressure (CmpPin) is greater than the preselected pressure (Plimit) and/or if the compressor inlet temperature (CmpTin) is greater than the preselected temperature (Tlimit), the fuel injection timing is maintained and the recirculation valve 30 is closed to increase the turbocharger speed as represented by step 110. If the compressor inlet pressure (CmpPin) is less than the preselected pressure (Plimit) and if the compressor inlet temperature (CmpTin) is less than the preselected temperature (Tlimit), the corrected turbocharger speed value (Corr_Trbsp) is compared with the preselected turbocharger speed (Trbsplimit) as represented by step 112. If the corrected turbocharger speed (Corr_Trbsp) is greater than the preselected turbocharger speed (Trbsplimit), then the opening of the recirculation valve 30 is increased to increase amount of air recirculation through the compressor 20 as represented by step 114. As a result, the turbocharger speed is reduced and the compressor choke is eliminated. If the corrected turbocharger speed (Corr_Trbsp) is less than the preselected turbocharger speed (Trbsplimit), the opening of the recirculation valve 30 is reduced to reduce the amount of air recirculation through the compressor 20 as represented by step 116. As a result turbocharger speed is increased.

If the opening of the recirculation valve 30 is increased or reduced, then the actual value indicative of the maximum pressure (Pmax) is compared to the expected value indicative of the maximum pressure (Pmax-limit) as represented by step 118. If the actual value indicative of the maximum pressure (Pmax) is less than the expected value indicative of the maximum pressure (Pmax-limit), then the power output of the engine 14 is maintained and the fuel injection timing within the combustion chamber may be advanced as represented by step 120. If the actual value indicative of the maximum pressure (Pmax) is greater than the expected value indicative of the maximum pressure (Pmax-limit), and if the fuel injection timing (AA) is greater than or equal to the predetermined injection timing limit (AAref) as represented by step 119, then the fuel injection timing within the combustion chamber may be retarded to reduce the maximum pressure within the combustion chamber as represented by step 122. If the actual value indicative of the maximum pressure (Pmax) is greater than the expected value indicative of the maximum pressure (Pmax-limit), and if the fuel injection timing (AA) is less than the predetermined injection timing limit (AAref), then the engine power must be reduced to satisfy the constraints as represented by step 123.

Figure 5:
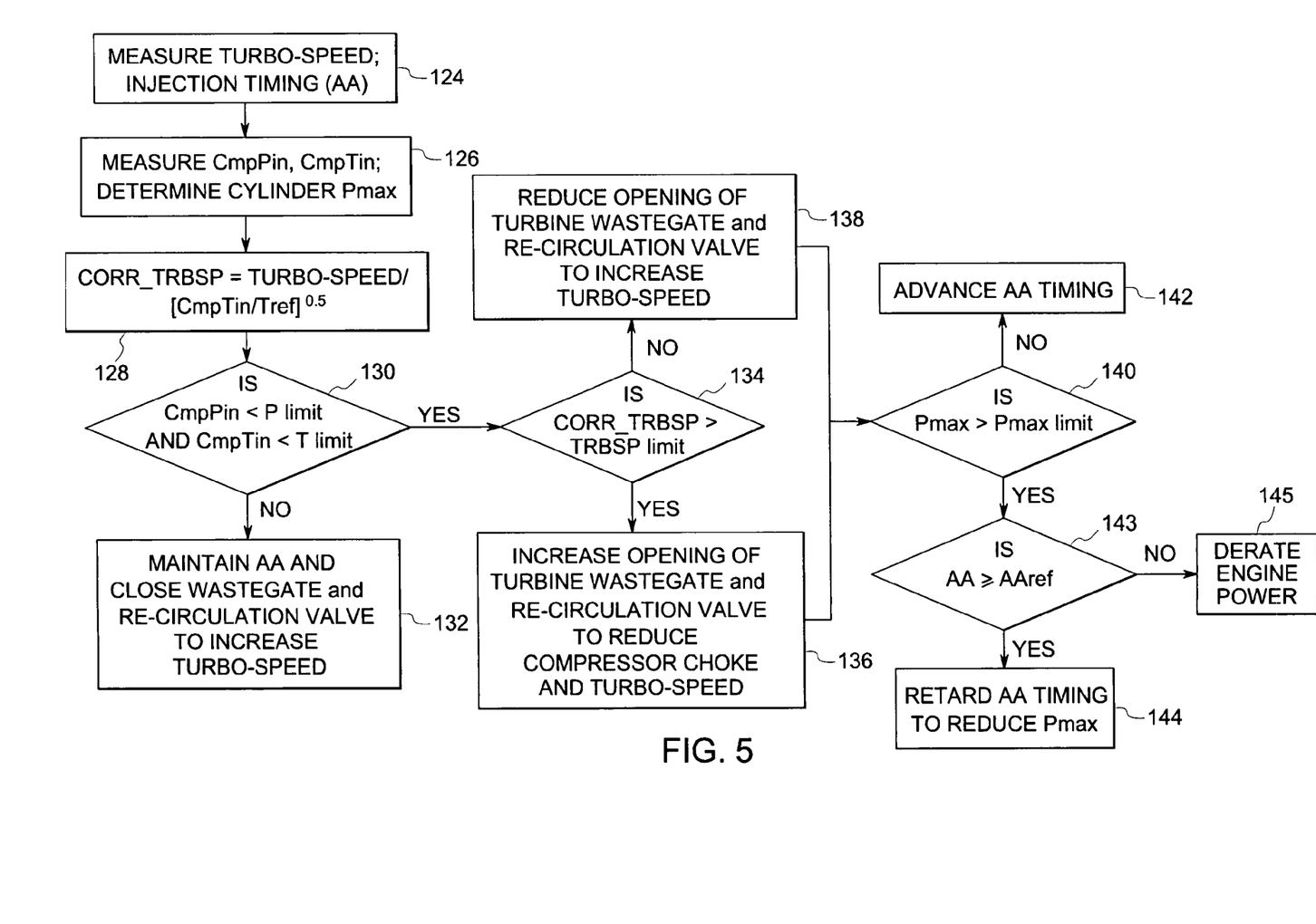

Referring to FIG. 5, this figure is a flow chart illustrating another embodiment of the method of operating the turbocharged system 10 of FIG. 1. In the illustrated embodiment, the controller 34 determines fuel injection timing or advance angle (AA) based on the position of the power lever as represented by step 124. The controller 34 also receives the turbocharger speed signal 62 from the speed sensor 64 provided to detect speed of the turbocharger 12. The controller 34 receives the compressor inlet pressure signal 54 generated by the inlet pressure sensor 56, and the compressor inlet temperature signal 58 generated by the inlet temperature sensor 60 as represented by step 126. The controller 34 also receives an actual value of a sensed parameter indicative of maximum pressure (Pmax) within a combustion chamber of the engine 14. The controller 34 also calculates an expected value indicative of the maximum pressure (Pmax-limit) within the combustion chamber. The expected value indicative of the maximum pressure (Pmax-limit) can be calculated based on the actual value indicative of the maximum pressure and the air temperature within the intake manifold 16. The corrected turbocharger speed value (Corr_Trbsp) is calculated based on the actual speed of the turbocharger 12 and the compressor inlet temperature (CmpTin) in accordance with the equation (1) as represented by step 128.

The compressor inlet pressure (CmpPin) is compared to the preselected pressure (Plimit) and the compressor inlet temperature (CmpTin) is compared to the preselected temperature (Tlimit) as represented by step 130. If the compressor inlet pressure (CmpPin) is greater than the preselected pressure (Plimit) and/or if the compressor inlet temperature (CmpTin) is greater than the preselected temperature (Tlimit), the fuel injection timing is maintained and the wastegate 32 and recirculation valve 30 are closed to increase the turbocharger speed as represented by step 132. If the compressor inlet pressure (CmpPin) is less than the preselected pressure (Plimit) and if the compressor inlet temperature (CmpTin) is less than the preselected temperature (Tlimit), then the corrected turbocharger speed value (Corr_Trbsp) is compared with the preselected turbocharger speed (Trbsplimit) as represented by step 134. If the corrected turbocharger speed (Corr_Trbsp) is greater than the preselected turbocharger speed (Trbsplimit), then the opening of the wastegate 32 and the recirculation valve 30 are increased to increase the amount of engine exhaust by-passing the turbine 22 and the amount of air recirculation through the compressor 20 as represented by step 136. The turbocharger speed is reduced and the compressor choke is eliminated. If the corrected turbocharger speed (Corr_Trbsp) is less than the preselected turbocharger speed (Trbsplimit), then the opening of the recirculation valve 30 and the wastegate 32 are reduced to reduce the amount of air recirculation through the compressor 20 and the amount of engine exhaust by-passing the turbine 22 as represented by step 138. As a result turbocharger speed is increased.

If the opening of the recirculation valve 30 and the wastegate 32 are increased or reduced, then the actual value indicative of the maximum pressure (Pmax) is compared to the expected value indicative of the maximum pressure (Pmax-limit) as represented by step 140. If the actual value indicative of the maximum pressure (Pmax) is less than the expected value indicative of the maximum pressure (Pmax-limit), then the power output of the engine 14 is maintained and the fuel injection timing within the combustion chamber may be advanced as represented by step 142. If the actual value indicative of the maximum pressure (Pmax) is greater than the expected value indicative of the maximum pressure (Pmax-limit), and if the fuel injection timing (AA) is greater than or equal to the predetermined injection timing limit (AAref) as represented by step 143, then the fuel injection timing within the combustion chamber may be retarded to reduce the maximum pressure within the combustion chamber as represented by step 144. If the actual value indicative of the maximum pressure (Pmax) is greater than the expected value indicative of the maximum pressure (Pmax-limit), and if the fuel injection timing (AA) is less than the predetermined injection timing limit (AAref), then the engine power must be reduced to satisfy the constraints by step 145.

Figure 6:
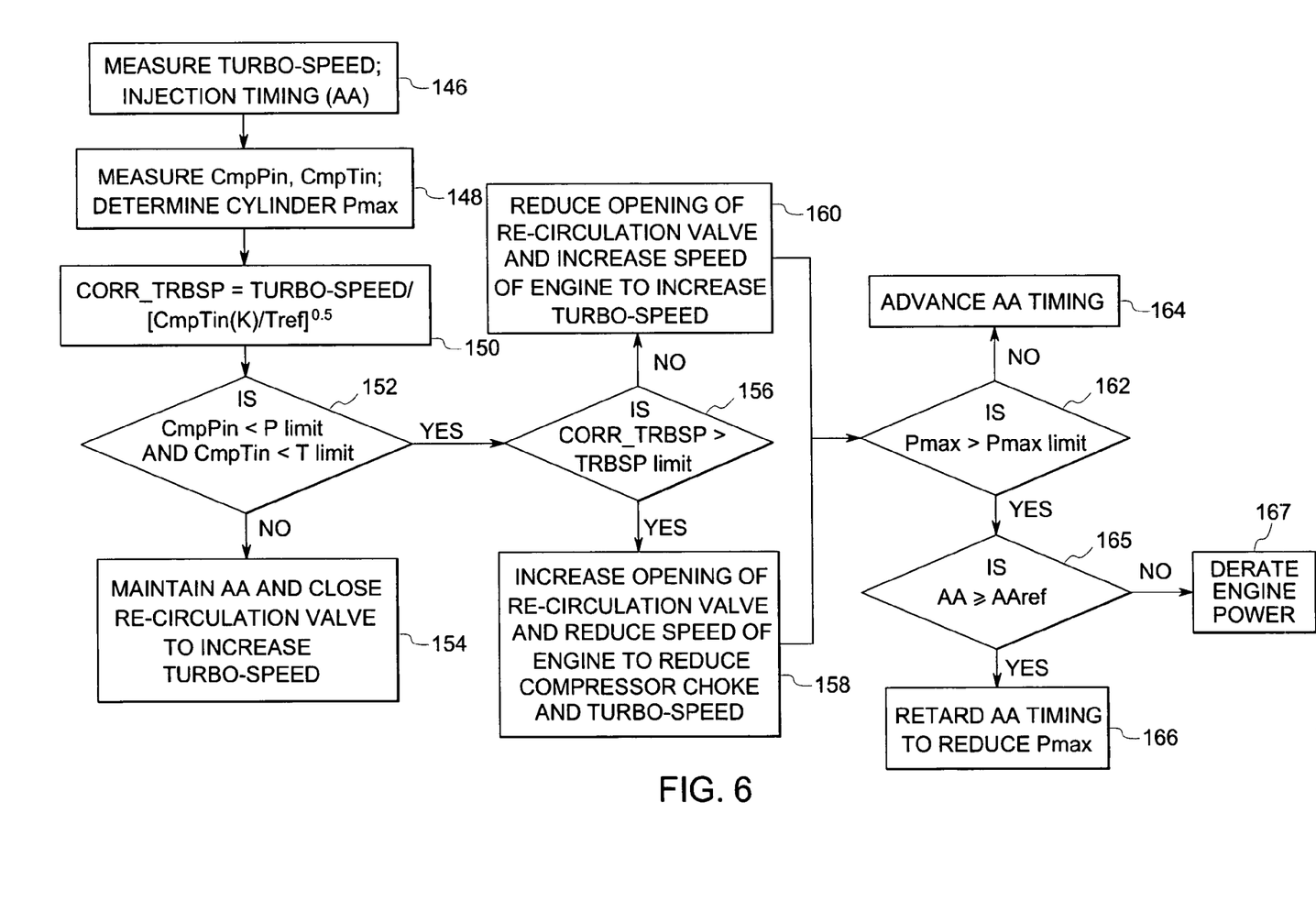

Referring to FIG. 6, this figure is a flow chart illustrating another embodiment of the method of operating the turbocharged system 10 of FIG. 1. In the illustrated embodiment, the controller 34 determines fuel injection timing or advance angle (AA) based on the position of the power lever as represented by step 146. The controller 34 also receives the turbocharger speed signal 62 from the speed sensor 64 provided to detect speed of the turbocharger 12. The controller 34 receives the compressor inlet pressure signal 54 generated by the inlet pressure sensor 56, and the compressor inlet temperature signal 58 generated by the inlet temperature sensor 60 as represented by step 148. The controller 34 also receives an actual value of a sensed parameter indicative of maximum pressure (Pmax) within a combustion chamber of the engine 14. The controller 34 also calculates an expected value indicative of the maximum pressure (Pmax-limit) within the combustion chamber. The expected value indicative of the maximum pressure (Pmax-limit) can be calculated based on the actual value indicative of the maximum pressure and the air temperature within the intake manifold 16. The corrected turbocharger speed value (Corr_Trbsp) is calculated based on the actual speed of the turbocharger 12 and the compressor inlet temperature (CmpTin) in accordance with the equation (1) as represented by step 150.

The compressor inlet pressure (CmpPin) is compared to the preselected pressure (Plimit) and the compressor inlet temperature (CmpTin) is compared to the preselected temperature (Tlimit) as represented by step 152. If the compressor inlet pressure (CmpPin) is greater than the preselected pressure (Plimit) and/or if the compressor inlet temperature (CmpTin) is greater than the preselected temperature (Tlimit), then the fuel injection timing is maintained and the recirculation valve 30 is closed to increase the turbocharger speed as represented by step 154. If the compressor inlet pressure (CmpPin) is less than the preselected pressure (Plimit) and if the compressor inlet temperature (CmpTin) is less than the preselected temperature (Tlimit), the corrected turbocharger speed value (Corr_Trbsp) is compared with the preselected turbocharger speed (Trbsplimit) as represented by step 156. If the corrected turbocharger speed (Corr_Trbsp) is greater than the preselected turbocharger speed (Trbsplimit), then the opening of the recirculation valve 30 is increased to increase the amount of engine exhaust by-passing the turbine 22 and the engine speed is reduced as represented by step 158. Hence turbocharger speed is reduced and the compressor choke is eliminated. If the corrected turbocharger speed (Corr_Trbsp) is less than the preselected turbocharger speed (Trbsplimit), then the opening of the recirculation valve 30 is reduced to reduce the amount of air recirculation through the compressor 20 and the engine speed is increased as represented by step 160. As a result, turbocharger speed is increased.

If the opening of the recirculation valve 30 and the engine speed are increased or decreased, then the actual value indicative of the maximum pressure (Pmax) is compared to the expected value indicative of the maximum pressure (Pmax-limit) as represented by step 162. If the actual value indicative of the maximum pressure (Pmax) is less than the expected value indicative of the maximum pressure (Pmax-limit), then the power output of the engine 14 is maintained and the fuel injection timing within the combustion chamber may be advanced as represented by step 164. If the actual value indicative of the maximum pressure (Pmax) is greater than the expected value indicative of the maximum pressure (Pmax-limit), and if the fuel injection timing (AA) is greater than or equal to the predetermined injection timing limit (AAref) as represented by step 165, then the fuel injection timing within the combustion chamber may be retarded to reduce the maximum pressure within the combustion chamber as represented by step 166. If the actual value indicative of the maximum pressure (Pmax) is greater than the expected value indicative of the maximum pressure (Pmax-limit), and if the fuel injection timing (AA) is less than the predetermined injection timing limit (AAref), then the engine power must be reduced to satisfy the constraints by step 167.

Figure 7:
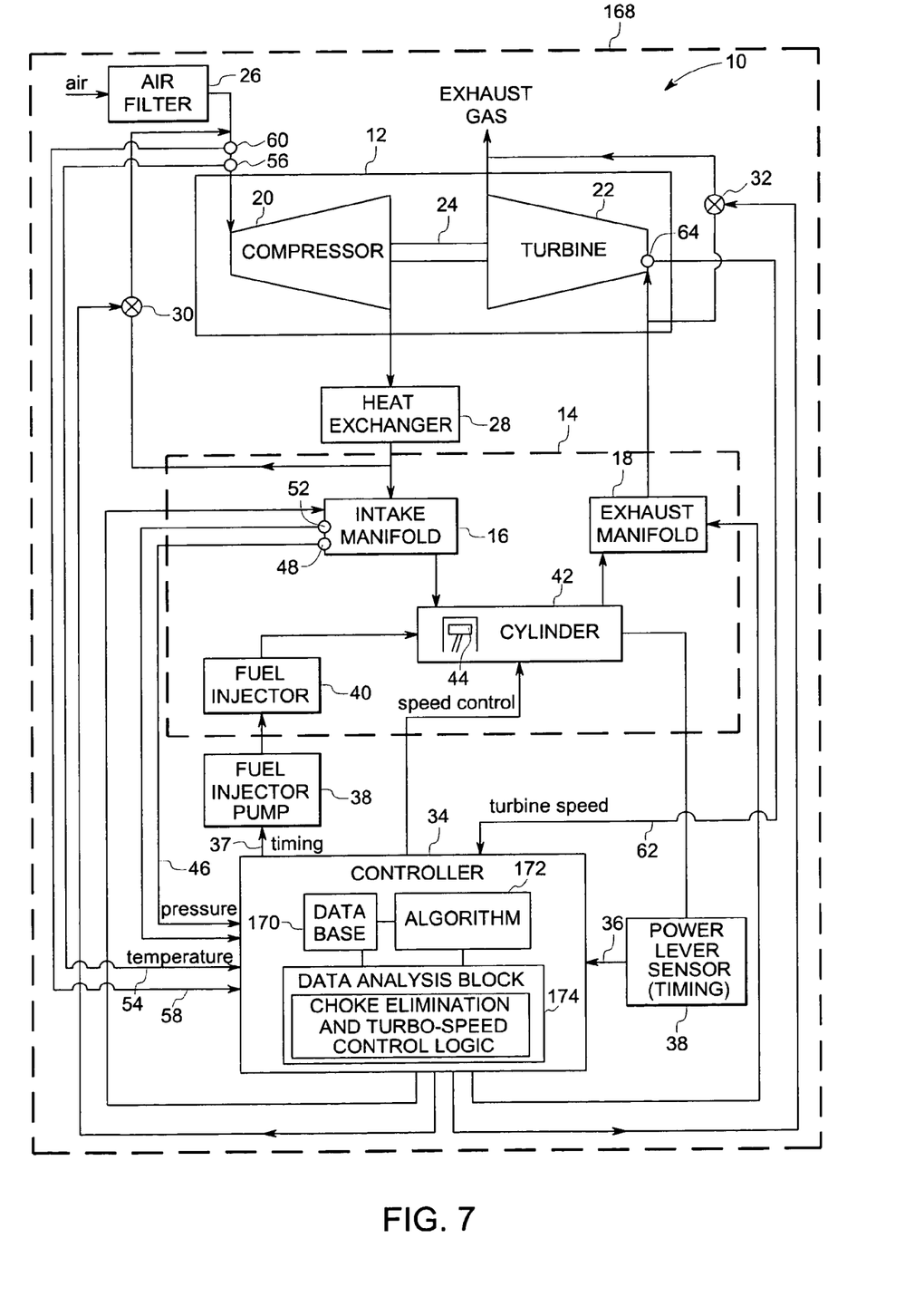
FIG. 7 is a diagrammatical representation of a system incorporating a turbocharged engine, such as a locomotive power unit, having choke elimination and turbocharger speed control features in accordance with an exemplary embodiment of the present technique.

Referring to FIG. 7, one embodiment of the locomotive power unit 10 is illustrated. As illustrated above, the power unit 10 includes the turbocharger 12 and the diesel engine 14. The power unit 10 may be used for driving a system 168. The system may include high altitude locomotive engine, automobile engine, or the like. The power unit 10 includes the controller 34. The controller 34 receives the power lever setting signal 36 from the power lever position sensor 38 provided to detect the position of the operator controlled power lever of the engine 14. The controller 34 may be operable to produce the timing signal 37 to control operation of the plurality of fuel injection pumps 38. The controller 34 may also receive the intake manifold air pressure signal 46 generated by the pressure sensor 48, the intake manifold air temperature signal 50 generated by the temperature sensor 52, the compressor inlet pressure signal 54 generated by the inlet pressure sensor 56, and the compressor inlet temperature signal 58 generated by the inlet temperature sensor 60. The controller 34 may also receive the turbocharger speed signal 62 from the speed sensor 64 provided to detect speed of the turbocharger 12.

In the illustrated embodiment, the controller 34 may further include a database 170, an algorithm 172, and a data analysis block 174. The database 170 may be configured to store predefined information about the power unit 10. For example, the database 170 may store information relating to temperature and pressure of the engine 14, fuel injection timing, turbocharger speed, compressor inlet pressure, compressor inlet temperature, power output of the engine 14, or the like. Furthermore, the database 170 may be configured to store actual sensed/detected information from the above-mentioned sensors. The algorithm 172 facilitates the processing of signals from the above-mentioned plurality of sensors.

The data analysis block 174 may include a range of circuitry types, such as a microprocessor, a programmable logic controller, a logic module, etc. The data analysis block 174 in combination with the algorithm 172 may be used to perform the various computational operations relating to determination of the turbocharger speed, compressor inlet temperature, compressor inlet pressure, maximum pressure within the combustion chamber, and the fuel injection timing. The controller 34 is configured to control speed of a turbine and substantially eliminate choke of a compressor coupled to the turbine by adjusting exhaust flow through a turbine wastegate, or by adjusting airflow through a compressor recirculation valve, or by adjusting a combination thereof in response to variance in parameters including the compressor inlet temperature, the compressor inlet pressure, and the turbocharger speed.

Figure 8:
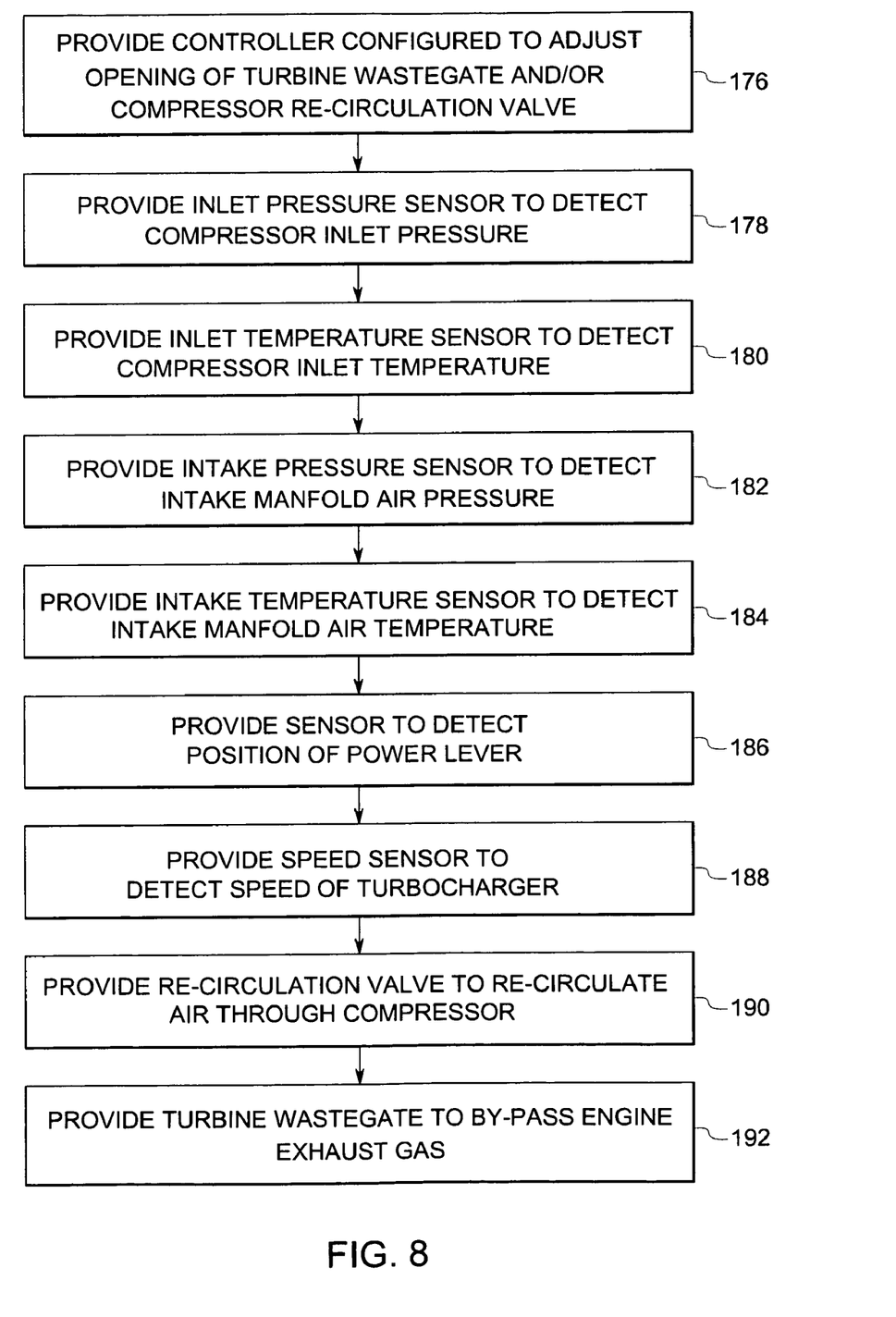
FIG. 8 is a flow chart illustrating an exemplary process of manufacturing a turbocharged engine, such as a locomotive power unit, having choke elimination and turbocharger speed control features in accordance with an exemplary embodiment of the present technique.

Referring to FIG. 8, this figure is a flow chart illustrating a method of manufacturing the power unit 10 in accordance with embodiments of the present technique. The method includes providing the controller 34 configured to adjust opening of the turbine wastegate 32 and/or the compressor recirculation valve 30 and reduce engine speed as represented by step 176. The controller 34 may be configured to retard fuel injection timing if the maximum pressure (Pmax) within the combustion chamber of the compression-ignition engine 14 exceeds the preselected maximum pressure (Pmax-limit) and the injection timing is greater than a preselected value. The controller 34 may further include the database 170, the algorithm 172, and the data analysis block 174. The method includes providing the inlet pressure sensor 56 configured to detect the compressor inlet pressure as represented by step 178. The method also includes providing the inlet temperature sensor 60 configured to detect the compressor inlet temperature as represented by step 180. The method also includes providing the intake pressure sensor 48 configured to detect the intake manifold air pressure as represented by step 182. The method further includes providing the intake temperature sensor 52 configured to detect the intake manifold air temperature as represented by step 184. The method also includes providing the power lever position sensor 38 configured to detect the position of the power lever as represented by step 186. The speed sensor 64 is also provided to detect speed of the turbocharger 12 as represented by step 188.

The method further includes providing the recirculation valve 30 configured to re-circulate compressed air through the compressor 20. As discussed above, the compressed air is re-circulated through the recirculation valve 30 to eliminate compressor choke under certain conditions. The method also includes providing the wastegate 64 configured to by-pass the engine exhaust around the turbine 22. In one example, at least 7% of the exhaust gas is by-passed around the turbine 22 to reduce turbocharger speed.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of operating a turbocharged system, comprising:

controlling speed of a turbocharger and substantially eliminating choke of a compressor coupled to a turbine by adjusting exhaust flow through a turbine wastegate, or by adjusting airflow through a compressor recirculation valve, or by adjusting a combination thereof in response to variance in parameters including compressor inlet temperature, compressor inlet pressure, and turbocharger speed;

calculating a corrected turbocharger speed based on an actual turbocarger speed and the compressor inlet temperature; and retarding or advancing fuel injection timing if a maximum pressure within a combustion chamber is greater than or less than a preselected maximum pressure, respectively.

2. The method of claim 1, further comprising at least partially opening the turbine wastegate, or the compressor recirculation valve, or a combination thereof if the compressor inlet pressure is less than a preselected pressure and if the compressor inlet temperature is less than a preselected temperature and if the turbocharger speed is greater than a preselected speed.

3. The method of claim 1, further comprising at least partially closing the turbine wastegate, or the compressor recirculation valve, or a combination thereof if the compressor inlet pressure is less than a preselected pressure and if the compressor inlet temperature is less than a preselected temperature and if the turbocharger speed is less than a preselected speed.

4. A method of manufacturing a turbocharged system, comprising:

providing a controller configured to control speed of a turbocharger and substantially eliminate choke of a compressor coupled to the turbine by adjusting airflow through a compressor recirculation valve in response to variance in parameters including compressor inlet temperature, compressor inlet pressure, and turbocharger speed;

wherein the controller is configured to calcuulate a corrected turbocharger speed based on an actual turbocharger speed and the compressor inlet temperature; wherein the controller configured to at least partially open or close a turbine wastegate to adjust exhaust flow to the atmosphere rather than to the turbine as the compressor inlet temperature, the compressor inlet pressure, and the turbocharger speed vary relative to preselected values.

5. The method of claim 4, comprising providing the controller configured to control speed of the turbocharger and substantially eliminate choke of the compressor coupled to the turbine by adjusting exhaust flow through a turbine wastegate in response to variance in parameters including compressor inlet temperature, compressor inlet pressure, and turbocharger speed.

6. A method of operating a turbocharged system, comprising:

controlling speed of a turbocharger and substantially eliminating choke of a compressor coupled to a turbine by adjusting exhaust flow through a turbine wastegate, or by adjusting airflow through a compressor recirculation valve, or by adjusting a combination thereof in response to variance in parameters including compressor inlet temperature, compressor inlet pressure, and turbocharger speed; wherein:

if the compressor inlet pressure and the compressor inlet temperature are less than first preselected values, then controlling comprises:

at least partially opening the turbine wastegate, or the compressor recirculation valve, or a combination thereof if the turbocharger speed is greater than a first preselected speed; or at least partially closing the turbine wastegate, or the compressor recirculation valve, or a combination thereof if the turbocharger speed is less than a second preselected speed; or if the compressor inlet pressure and the compressor inlet temperature are greater than second preselected values, then controlling comprises at least partially closing the turbine wastegate.

7. The method of claim 6, wherein adjusting exhaust flow comprises at least partially opening the turbine wastegate, or adjusting airflow comprises at least partially opening the compressor recirculation valve, or a combination thereof if the compressor inlet pressure is less than a preselected pressure and if the compressor inlet temperature is less than a preselected temperature and if the turbocharger speed is greater than a preselected speed.

8. The method of claim 6, wherein adjusting exhaust flow comprises at least partially closing the turbine wastegate, or adjusting airflow comprises at least partially opening the compressor recirculation valve, or a combination thereof if the compressor inlet pressure is less than a preselected pressure and if the compressor inlet temperature is less than a preselected temperature and if the turbocharger speed is less than a preselected speed.

9. The method of claim 6, comprising at least partially closing the turbine wastegate if the compressor inlet pressure is greater than a preselected pressure and if the compressor inlet temperature is greater than a preselected temperature.

10. The method of claim 6, comprising retarding fuel injection timing if a maximum pressure within a combustion chamber exceeds a preselected maximum pressure.

11. The method of claim 6, comprising advancing fuel injection timing if a maximum pressure within a combustion chamber is less than a preselected maximum pressure.

12. The method of claim 6. wherein controlling speed of the turbocharger and substantially eliminating choke of the compressor is performed by derating engine power.

13. The method of claim 6, wherein controlling speed of the turbocharger and substantially eliminating choke of the compressor comprises at least partially opening or closing the turbine wastegate to adjust exhaust flow to the atmosphere rather than the turbine as the compressor inlet temperature, the compressor inlet pressure, and the turbocharger speed vary relative to preselected values.

14. The method of claim 6, comprising retarding or advancing fuel injection timing if a maximum pressure within a combustion chamber is greater than or less than a preselected maximum pressure, respectively.

15. A system, comprising:

a controller configured to control speed of a turbocharger and substantially eliminate choke of a compressor coupled to a turbine by adjusting airflow through a compressor recirculation valve in response to variance in parameters including compressor inlet temperature, compressor inlet pressure, and turbocharger speed;

wherein the controller is configured to calculate a corrected turbocharger speed based on an actual turbocharger speed and the compressor inlet temperature; wherein the controller is configured to control speed of the turbocharger and substantially eliminate choke of the compressor coupled to the turbine by adjusting exhaust flow through a turbine wastegate in response to variance in parameters including compressor inlet temperature, compressor inlet pressure, and turbocharger speed.

16. The system of claim 15, wherein the controller is configured to at least partially open the turbine wastegate, or the compressor recirculation valve, or a combination thereof if the compressor inlet pressure is less than a preselected pressure and if the compressor inlet temperature is less than a preselected temperature and if the turbocharger speed is greater than a preselected speed.

17. The system of claim 15, wherein the controller is configured to at least partially close the turbine wastegate, or the compressor recirculation valve, or a combination thereof if the compressor inlet pressure is less than a preselected pressure and if the compressor inlet temperature is less than a preselected temperature and if the turbocharger speed is less than a preselected speed.

18. A system, comprising:
a controller configured to control speed of a turbocharger and substantially eliminate choke of a compressor coupled to a turbine by adjusting exhaust flow through a turbine wastegate, or by adjusting airflow through a compressor recirculation valve, or by adjusting a combination thereof in response to variance in parameters including compressor inlet temperature, compressor inlet pressure, and turbocharger speed; and
an intake manifold air temperature sensor, an intake manifold air pressure sensor, a fuel injection timing sensor, and a turbocharger speed sensor;
wherein the controller is configured to calculate a corrected turbocharger speed based on an actual turbocharger speed and the compressor inlet temperature; wherein the controller is configured to determine a maximum pressure in a combustion chamber based on signals from the intake manifold air temperature sensor, or the intake manifold air pressure sensor, or the fuel injection timing sensor, or a combination thereof.

19. A computer-readable medium having a computer program comprising:
code to control speed of a turbocharger and substantially eliminate choke of a compressor coupled to the turbine by adjusting exhaust flow through a turbine wastegate, or by adjusting airflow through a compressor recirculation valve, or by adjusting a combination thereof in response to variance in parameters including compressor inlet temperature, compressor inlet pressure, and turbocharger speed;
wherein if the compressor inlet pressure is less than a preselected pressure and if the compressor inlet temperature is less than a preselected temperature, then
the code is configured for at least partially opening the turbine wastegate, or the compressor recirculation valve, or a combination thereof, if the turbocharger speed is greater than a preselected speed; or
the code is configured for at least partially closing the turbine wastegate, or the compressor recirculation valve, or a combination thereof, if the turbocharger speed is less than a preselected speed.

20. The computer-readable medium of claim 19, wherein the code is configured for at least partially opening the turbine wastegate, or the compressor recirculation valve, or the combination thereof if the compressor inlet pressure is less than the preselected pressure and if the compressor inlet temperature is less than the preselected temperature and if the turbocharger speed is greater than the preselected speed.

21. The computer-readable medium of claim 19, wherein the code is configured for at least partially closing the turbine wastegate, or the compressor recirculation valve, or the combination thereof if the compressor inlet pressure is less than the preselected pressure and if the compressor inlet temperature is less than the preselected temperature and if the turbocharger speed is less than the preselected speed.

22. The computer-readable medium of claim 19, wherein the code is configured to at least partially open or close the turbine wastegate to adjust exhaust flow to the atmosphere rather than the turbine as the compressor inlet temperature, the compressor inlet pressure, and the turbocharger speed vary relative to preselected values.

23. The computer-readable medium of claim 19, wherein the code is configured for calculating a corrected turbocharger speed based on an actual turbocharger speed and the compressor inlet temperature.

24. A system, comprising:
a controller configured to control speed of a turbocharger and substantially eliminate choke of a compressor coupled to a turbine by adjusting exhaust flow through a turbine wastegate, or by adjusting airflow through a compressor recirculation valve, or by adjusting a combination thereof in response to variance in parameters including compressor inlet temperature, compressor inlet pressure, and turbocharger speed; wherein:
if the compressor inlet pressure and the compressor inlet temperature are less than first preselected values, then the controller is configured to:
at least partially open the turbine wastegate, or the compressor recirculation valve, or a combination thereof if the turbocharger speed is greater than a first preselected speed; or
at least partially close the turbine wastegate, or the compressor recirculation valve, or a combination thereof if the turbocharger speed is less than a second preselected speed; or
if the compressor inlet pressure and the compressor inlet temperature are greater than second preselected values, then the controller is configured to at least partially close the turbine wastegate.

25. The system of claim 24, further comprising an inlet pressure sensor configured to detect the compressor inlet pressure and an inlet temperature sensor configured to detect the compressor inlet temperature.

26. The system of claim 24, wherein the controller is configured to calculate a corrected turbocharger speed based on an actual turbocharger speed and the compressor inlet temperature.

27. The system of claim 24, wherein the controller is configured to at least partially open the turbine wastegate, or the compressor recirculation valve, or a combination thereof if the compressor inlet pressure is less than a preselected pressure and if the compressor inlet temperature is less than a preselected temperature and if the turbocharger speed is greater than a preselected speed.

28. The system of claim 24, wherein the controller is configured to at least partially close the turbine wastegate, or the compressor recirculation valve, or a combination thereof if the compressor inlet pressure is less than a preselected pressure and if the compressor inlet temperature is less than a preselected temperature and if the turbocharger speed is less than a preselected speed.

29. The system of claim 24, further comprising an intake manifold air temperature sensor, an intake manifold air pressure sensor, a fuel injection timing sensor, and a turbocharger speed sensor.

30. The system of claim 29, wherein the controller is configured to determine a maximum pressure in a combustion chamber based on signals from the intake manifold air temperature sensor, or the intake manifold air pressure sensor, or the fuel injection timing sensor, or a combination thereof 31. The system of claim 30, wherein the controller is configured to retard fuel injection timing if the maximum pressure within the combustion chamber exceeds a preselected maximum pressure, and if fuel injection timing is greater than or equal to a predetermined injection timing limit.

32. The system of claim 31, wherein the controller is configured to advance fuel injection timing if the maximum pressure within the combustion chamber is less than a preselected maximum pressure, and if the fuel injection timing is less than the predetermined injection timing limit.

33. The system of claim 24, wherein the controller is configured to control engine speed.

34. The system of claim 24, comprising the turbocharger having the controller.

35. The system of claim 24, comprising a compression-ignition engine having the controller.

36. The system of claim 24, comprising a locomotive having the controller coupled to an engine.

37. The system of claim 24, comprising an automobile having the controller coupled to an engine.

38. The system of claim 24, wherein the controller is configured to at least partially open or close the turbine wastegate to adjust exhaust flow to the atmosphere rather than the turbine as the compressor inlet temperature, the compressor inlet pressure, and the turbocharger speed vary relative to preselected values.

39. The system of claim 24, wherein the controller is configured to retard or advance fuel injection timing if a maximum pressure within a combustion chamber is greater than or less than a preselected maximum pressure, respectively.

* * * * *

UNITED STATES PATENT AND TRADEMARK OFFICE
CERTIFICATE OF CORRECTION

PATENT NO. : 8,375,714 B2  
APPLICATION NO. : 11/167420  
DATED : February 19, 2013  
INVENTOR(S) : Gokhale et al.

It is certified that error appears in the above-identified patent and that said Letters Patent is hereby corrected as shown below:

In the Drawings:

In Fig. 8, Sheet 8 of 8, for Tag "182", in Line 2, delete "MANFOLD" and insert -- MANIFOLD --, therefor.

In Fig. 8, Sheet 8 of 8, for Tag "184", in Line 2, delete "MANFOLD" and insert -- MANIFOLD --, therefor.

In the Claims:

In Column 11, Line 8, in Claim 1, delete "turbocarger" and insert -- turbocharger --, therefor.

In Column 11, Line 38, in Claim 4, delete "calcuulate" and insert -- calculate --, therefor.

In Column 11, Line 41, in Claim 4, delete "controller" and insert -- controller is --, therefor.

Signed and Sealed this  
Seventh Day of May, 2013

Teresa Stanek Rea  
*Acting Director of the United States Patent and Trademark Office*